United States Patent [19]
Niimi

[11] Patent Number: 5,626,823
[45] Date of Patent: May 6, 1997

[54] STERILIZING APPARATUS AND MANUFACTURING APPARATUS FOR LIQUEFIED PRODUCT

[75] Inventor: Tomio Niimi, Nagoya, Japan

[73] Assignees: Kankyokagakukogyo Kabushiki Kaisha; Hitoshi Imai, both of Nagoya, Japan

[21] Appl. No.: 517,747

[22] Filed: Aug. 22, 1995

[30] Foreign Application Priority Data

Aug. 24, 1994 [JP] Japan .................................. 6-224268

[51] Int. Cl.$^6$ ..................................................... A23C 3/02
[52] U.S. Cl. ............................... 422/307; 99/470; 165/66
[58] Field of Search ............................... 422/307; 99/470; 165/61, 66

[56] References Cited

U.S. PATENT DOCUMENTS 4,584,932  4/1986  Abma ........................................ 99/470
4,667,590  5/1987  Balaam et al. ........................... 99/470
4,850,270  7/1989  Bronnert ................................... 99/470

FOREIGN PATENT DOCUMENTS

0036124A2  9/1981  European Pat. Off. .
WO93/08697  5/1993  WIPO .

*Primary Examiner*—Robert J. Warden
*Assistant Examiner*—Theresa T. Snider
*Attorney, Agent, or Firm*—Flynn, Thiel, Boutell & Tanis, P.C.

[57] ABSTRACT

Liquefied product can pass through a sterilizing apparatus at high temperature and in a short time with high efficiency of heat transfer so that sterilizing effect can be enhanced, loss of fragrant component is prevented, and at the same time fats and fibers of raw materials are homogenized. A sterilizing apparatus including heating element 16 and a cooling element concentrically including a pair of heat transfer discs having a plurality of polygonal small chambers thereon which are open at fronts thereof, in each pair the heat transfer discs being coupled to each other face to face, wherein the small chambers are alternately arranged with one another so as to communicate with one another.

6 Claims, 15 Drawing Sheets

FIG. 7
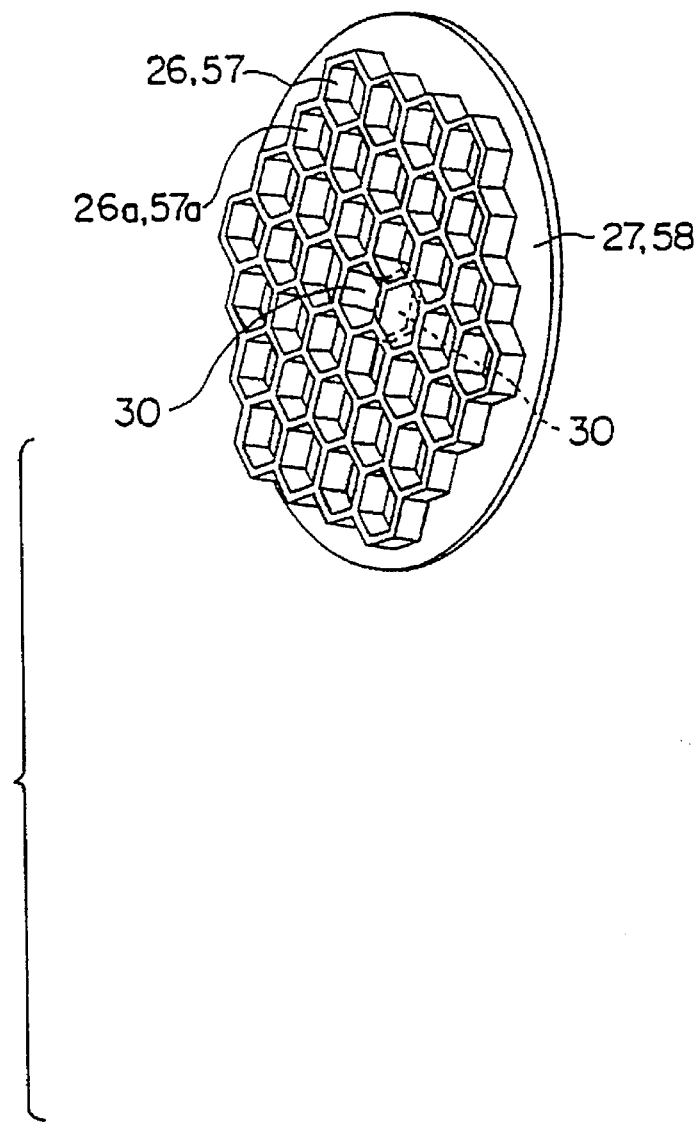
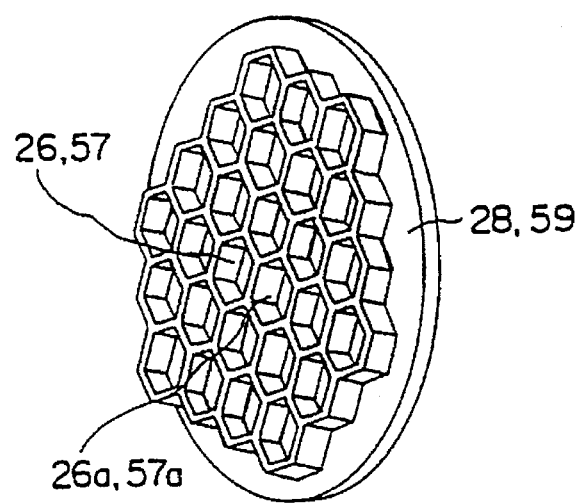

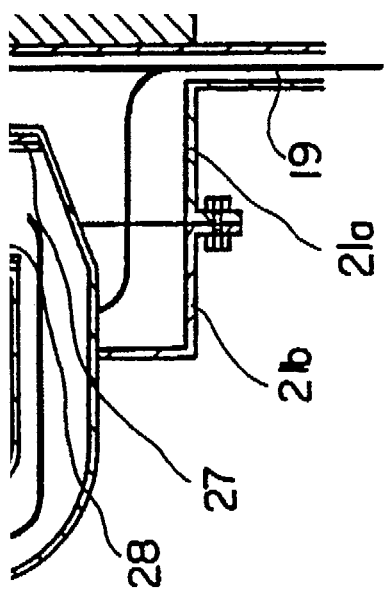

STERILIZING APPARATUS AND MANUFACTURING APPARATUS FOR LIQUEFIED PRODUCT

BACKGROUND OF THE INVENTION

1. Field of the Invention

The present invention relates to a sterilizing apparatus for sterilizing an outer surface of a container to be packed of liquefied product such as fresh beverages, milk, coffee, beer, raw sake, soy sauce, sauce instantaneously at high temperature and a manufacturing apparatus for liquefied product.

2. Prior Art

In a prior art high temperature sterilizing apparatus for liquefied product, a plurality of plates are arranged in parallel with one another, wherein a liquefied product, a vapor of high temperature, cooling water, etc. are permitted to flow between these plates, and the liquefied product is heated and cooled by the heated and cooled plates. In such a means, heat is transferred to the liquefied product only when contacting a surface layer of flowing fluid, and hence the fluid has no irregularity in its temperature distribution during the flowing thereof, and quantity of fluid which does not contact the heat transfer surface is large so that thermal efficiency is relatively low. Accordingly, in case of liquefied product such as milk, etc. using this means, it takes at least 2 seconds at a temperature of 140° C. to quickly heat the liquefied product from a normal temperature.

However, the drawback in this type of sterilization of the liquefied product is that protein is denatured, vitamin is broken, nutrition such as flavor, ingredient is broken, particularly, component which becomes a base of flavor such as Japanese Sake and juice is very weak even in such second heating for 2 seconds.

There has been recently developed a sterilizing apparatus for solving the aforementioned drawbacks in which liquefied product is permitted to flow in a capillary having a diameter of at least 1 mm at about 100 km/h under vapor of high temperature at about 200° C., and heating time is at least 1/100 second.

However, although such a sterilizing apparatus can improve sterilizing efficiency by reducing heating time, there is such a drawback that it is difficult to cleanse the inside of the capillary and sufficient cleansing effect can be obtained since the capillary has the diameter of at least 1 mm.

Further, the aforementioned sterilizing means merely heat the liquefied product, and hence it has such a drawback that a homogenizing process by a homogenizer having a stirring mixing blades is needed before and after a sterilizing step since the liquefied product such as milk, bean milk, fruit juice and vegetable juice includes fats and fibers, etc. Still further, there is another drawback that since this homogenizing process is performed in an open state, the liquefied product is liable to be contaminated by bacilli.

SUMMARY OF THE INVENTION

It is an object of the invention to provide a sterilizing apparatus and a manufacturing apparatus for liquefied product which is capable of achieving high efficiency of heat transfer by permitting the raw materials to be subjected to striking at right angles, dispersing, joining, meandering, swirling and mixing of the raw materials so that they can pass through the sterilizing apparatus at high temperature and in a short time. It is another object of the invention to provide a sterilizing apparatus and a manufacturing apparatus for liquefied product which is also capable of enhancing the sterilizing effect, capable of preventing loss of fragrant component, and at the same time, capable of homogenizing fats and fibers of the raw material, also capable of easily disassembling and cleaning the casing and elements thereof. It is still another object of the invention to provide a sterilizing apparatus and a manufacturing apparatus for liquefied product which is capable of simplifying structures thereof, capable of preventing heat transfer loss from chambers provided therein to each element, and also capable of preventing a sterilized liquefied product from being contaminated by permitting a plurality of raw material to be sterilized and homogenized so as to form a closed system.

In view of the prior art problems in that instantaneous sterilization time at high temperature has limitations due to low heat transfer efficiency, and homogenization can not be performed together with sterilization, the present invention has been made to solve such prior art problems. More in detail, heat transfer can be performed with high efficiency, and homogenization can be performed, and further a closed system can be established by permitting raw material to be subjected to striking at right angles, dispersing, joining, meandering, swirling and mixing with one another while it flows because of the provision of heating and cooling elements each comprising a pair of heat transfer discs having a plurality of polygonal small chambers thereon which are open at fronts thereof, wherein the small chambers are alternately arranged with one another so as to communicate with one another.

A sterilizing apparatus comprising a heating portion comprising a heating element having a first inlet and a first outlet, and a cooling portion comprising a cooling element having a second inlet and a second outlet through which a cooled raw material is discharged.

The heating element is controlled to be heated by a heating source provided in a heating casing which is partitioned at an inner space thereof, and the cooling element is controlled to be cooled by a cooling source provided in a cooling casing which is partitioned at an inner space thereof.

The heating element and the cooling element each comparing a pair of heat transfer discs having a plurality of polygonal small chambers thereon which are open at fronts thereof, in each pair said heat transfer discs being coupled to each other face to face, wherein said small chambers of one heat transfer disc are alternately arranged with said small chambers of the other heat transfer disc so as to communicate with one another, and either of the heat transfer discs has a circulation hole formed at a center of either of the heat transfer discs.

A manufacturing apparatus of liquefied product comprises a raw material storing tank and a product storing tank wherein the product storing tank is in an inert atmosphere at an inner portion thereof, and the raw material storing tank and the product storing tank are connected to each other by way of supply pipe passages so as to permit said raw material storing tank to communicate with the product storing tank, and wherein a pump is provided upstream relative to the raw material storing tank, and sterilizing apparatus is provided downstream relative to the pump. The material storing tank and the sterilizing apparatus may be plural in numbers, and sterilized raw materials are further mixed with one another by a fluid mixing apparatus for mixing a plurality of fluids.

BRIEF DESCRIPTION OF THE DRAWINGS

FIG. 7 is a perspective view of two heat transfer discs in the sterilizing apparatus;

FIG. 15 is a schematic cross-sectional view of the fluid mixing apparatus taken along A—A in FIG. 14.

PREFERRED EMBODIMENT OF THE INVENTION

Figure 1:
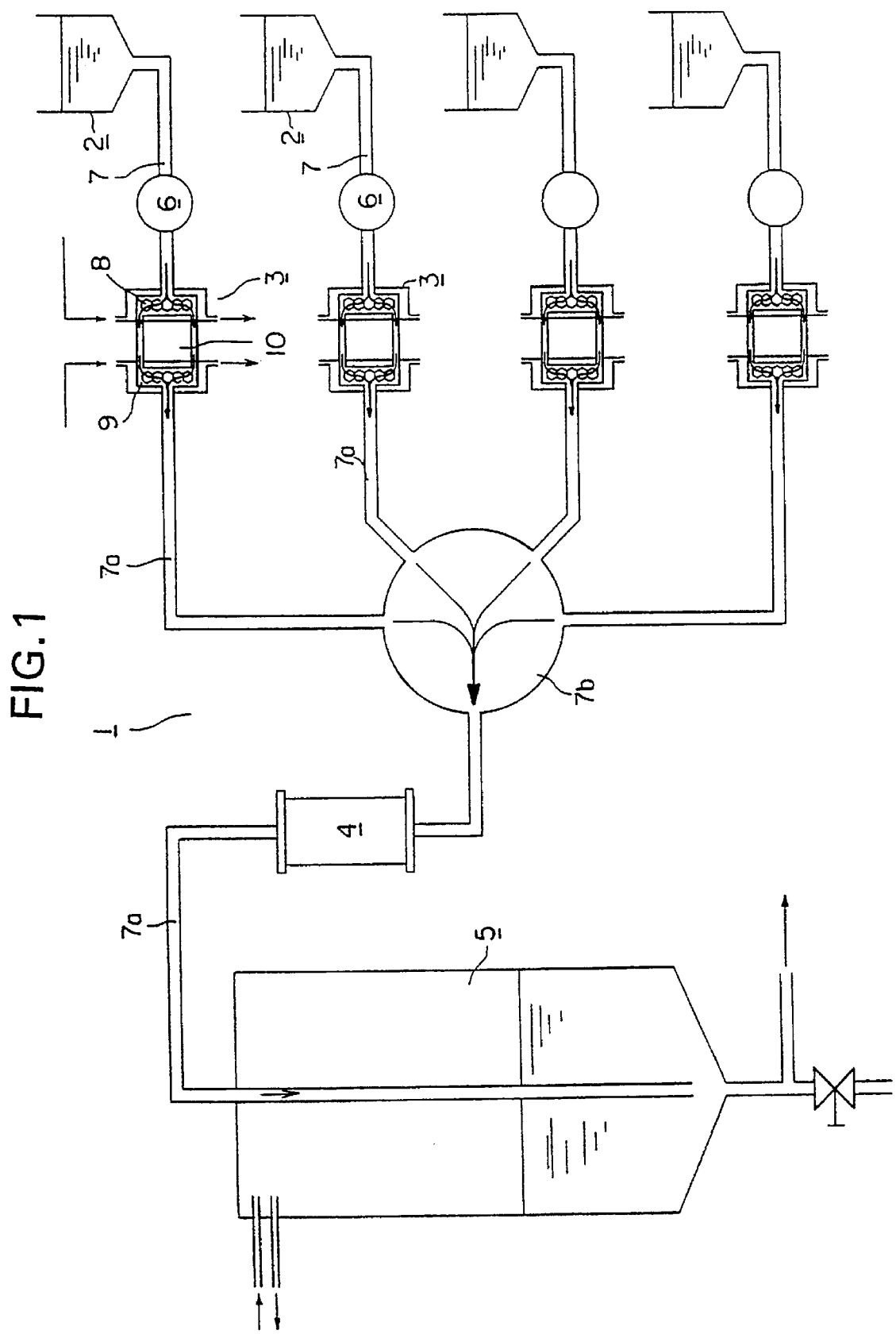
FIG. 1 is a schematic view of a manufacturing apparatus provided with a sterilizing apparatus for liquefied product according to a first embodiment of the invention.
Figure 2:
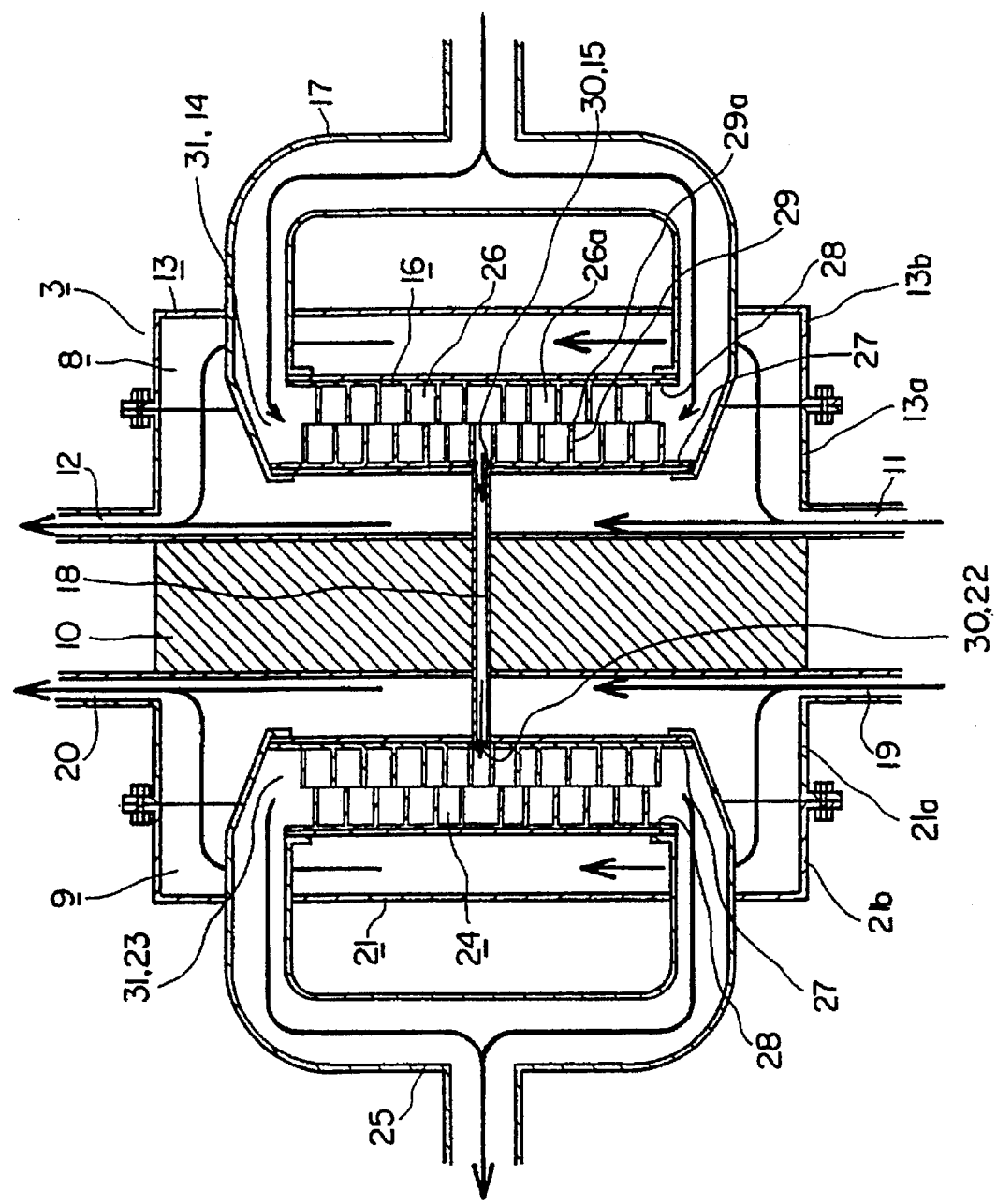
FIG. 2 is a schematic cross-sectional view of the sterilizing apparatus in FIG. 1.

First Embodiment (FIGS. 1 to 2)

Denoted at 1 is a manufacturing apparatus 1 which subjects a variety of liquefied products to instantaneous sterilization at high temperature in the course of manufacturing steps of the liquefied products such as fruit beverage, vegetable beverage, lactic acid beverage, dairy fruit beverage, fragrant syrup, compound lemon, artificial fruit beverage, spring water, mineral water, milk, coffee, beer, unsterilized sake, soy sauce, sauce, etc. before raw materials, which have been manufactured in the manufacturing steps, are packed by packing bodies such as bottling, canning, paper bagging. The manufacturing apparatus 1 comprises raw material storing tank 2, a plurality of sterilizing apparatus 3, a fluid mixing apparatus 4, and a product storing tank 5.

It is preferable that each element having heat transfer surface which directly contacts the raw material is made of materials which do not exert bad influence upon quality of the liquefied product, and metal of high thermal conductivity, such as stainless steel, nickel bronze, tin, titanium.

The raw material storing tank 2 stores raw material, which has been processed in each processing step before it is subjected to sterilizing process. The raw material storing tanks 2 has an outlet connected to communicate with one end of a first supply pipe passage 7. A sanitary type pump 6 for sucking and discharging a given amount of raw material is interposed on the first supply pipe passage 7. The other end of the first supply pipe passage 7 is connected to an inlet of the sterilizing apparatus 3.

An outlet of the sterilizing apparatus 3 is connected so as to communicate with one end of a second supply pipe passage 7a, and the other end of the second supply pipe passage 7a is inserted into the product storing tank 5 for storing the sterilized raw material. The product storing tank 5 is filled with an inert gas, thus it is in an inert atmosphere.

In case of providing a plurality of sterilizing apparatus 3, outlets of the raw material storing tanks 2 are connected to communicate with a plurality of first supply pipe passages 7 which are connected to communicate with inlets of sterilizing apparatus 3 by way of the pumps 6. A fluid mixing apparatus 4 is provided on the second supply pipe passage 7a and located between the sterilizing apparatus 3 and the product storing tank 5. An intermediate chamber 7b is interposed between the sterilizing apparatus 3 and the fluid mixing apparatus 4 wherein the intermediate chamber 7b once stores sterilized various raw materials which are discharged from each sterilizing apparatus 3.

Figure 3:
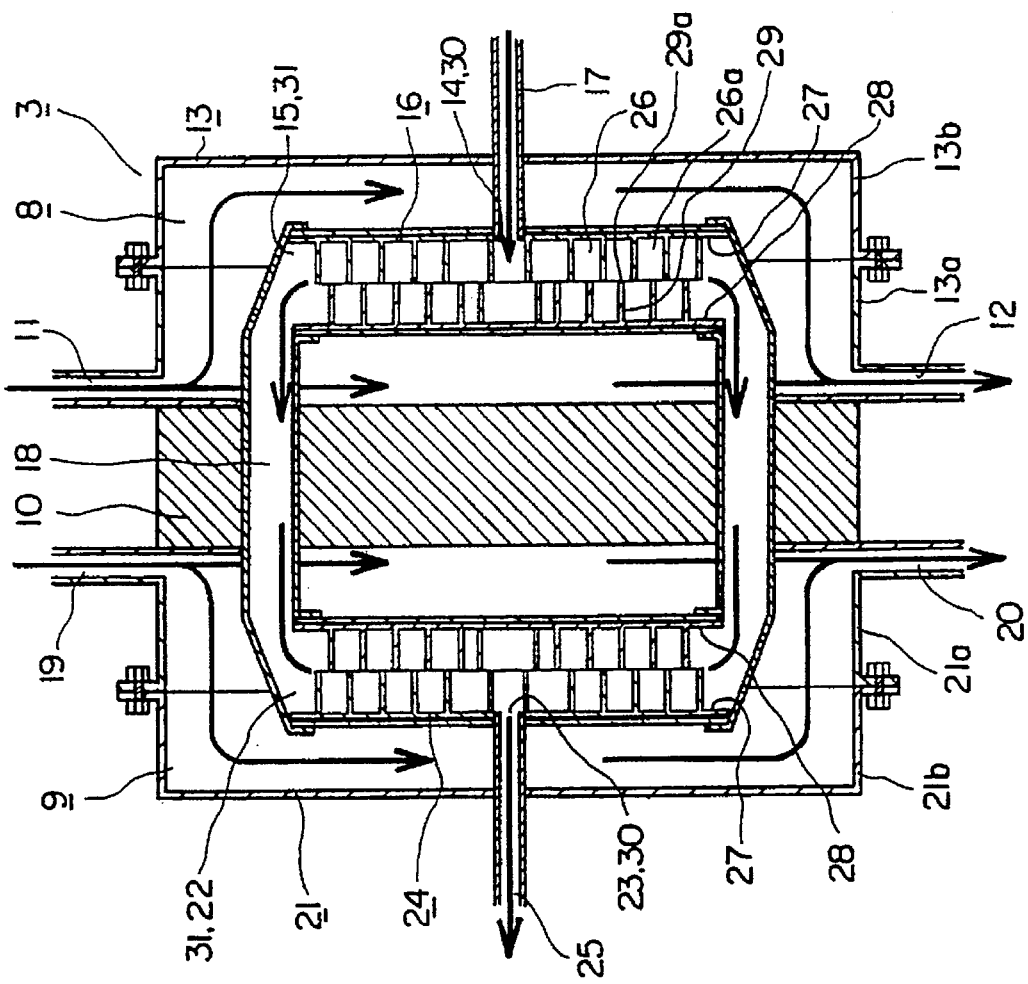
FIG. 3 is a schematic cross-sectional view of a sterilizing apparatus according to a second embodiment of the invention.

The sterilizing apparatus 3 comprises, as shown in FIGS. 2 and 3, a heating portion 8 and a cooling portion 9. A heat insulating material 10 is interposed between the heating portion 8 and the cooling portion 9.

The heating portion 8 includes a heating medium inlet 11 and a heating medium outlet 12 through which heating medium is circulated, and further defines an inner space having a given capacity in which a heating source as a heating medium is housed. The heating portion 8 further includes a heating casing 13 as a heating means which is controlled to be heated. A heating element 16 including a first inlet 14, through which the raw material to be heated is introduced, and a first outlet 15, through which the heated raw material is discharged, is provided in the heating casing 13, wherein an end of a supply pipe 17 penetrating the heating casing 13 is connected so as to communicate with the first inlet 14 of the heating element 16, wherein the raw material to be heated is supplied through the supply pipe 17. An end of a raw material connecting passage 18 penetrating the heat insulating material 10 is connected so as to communicate with the first outlet 15 of the heating casing 13.

The heating casing 13 comprises two dividing casings 13a and 13b each having a box-shape and being opened at the front thereof. The front opened portions of these dividing casings can be watertightly coupled with each other so that the cleaning maintenance can be easily performed owing to such a dividable heating casing 13.

The cooling portion 9, as another constituting element of the sterilizing apparatus 3, includes a cooling medium inlet 19 and a cooling medium outlet 20 through which cooling medium is circulated, and further defines an inner space having a given capacity in which a cooling source as a cooling medium is housed. The cooling portion 9 further includes a cooling casing 21 as a cooling means which is controlled to be cooled. A cooling element 24 including a second inlet 22, through which the raw material to be cooled, which is heated at high temperature, is introduced, and a second outlet 23, through which the cooled raw material is discharged, is provided in the heating casing 21, wherein the other end of a raw material connecting passage 18 penetrating the heat insulating material 10 is connected so as to communicate with the second inlet 22 of the cooling element 24. An end of a raw material discharge passage 25 formed of a pipe, etc. which penetrates the cooling casing 21 is connected so as to communicate with the second outlet 23 of the cooling element 24.

The cooling casing 21 comprises, like the heating casing 13, two dividing casings 21a and 21b each having a box-shape and being opened at the front thereof. The front opened portions of these dividing casings 21a and 21b can be watertightly coupled with each other so that the cleaning maintenance can be easily performed owing to such a dividable cooling casing 21.

Described hereinafter is the heating element 16 provided in the heating portion 8 and the cooling element 24 provided in the cooling portion 9.

Figure 6:
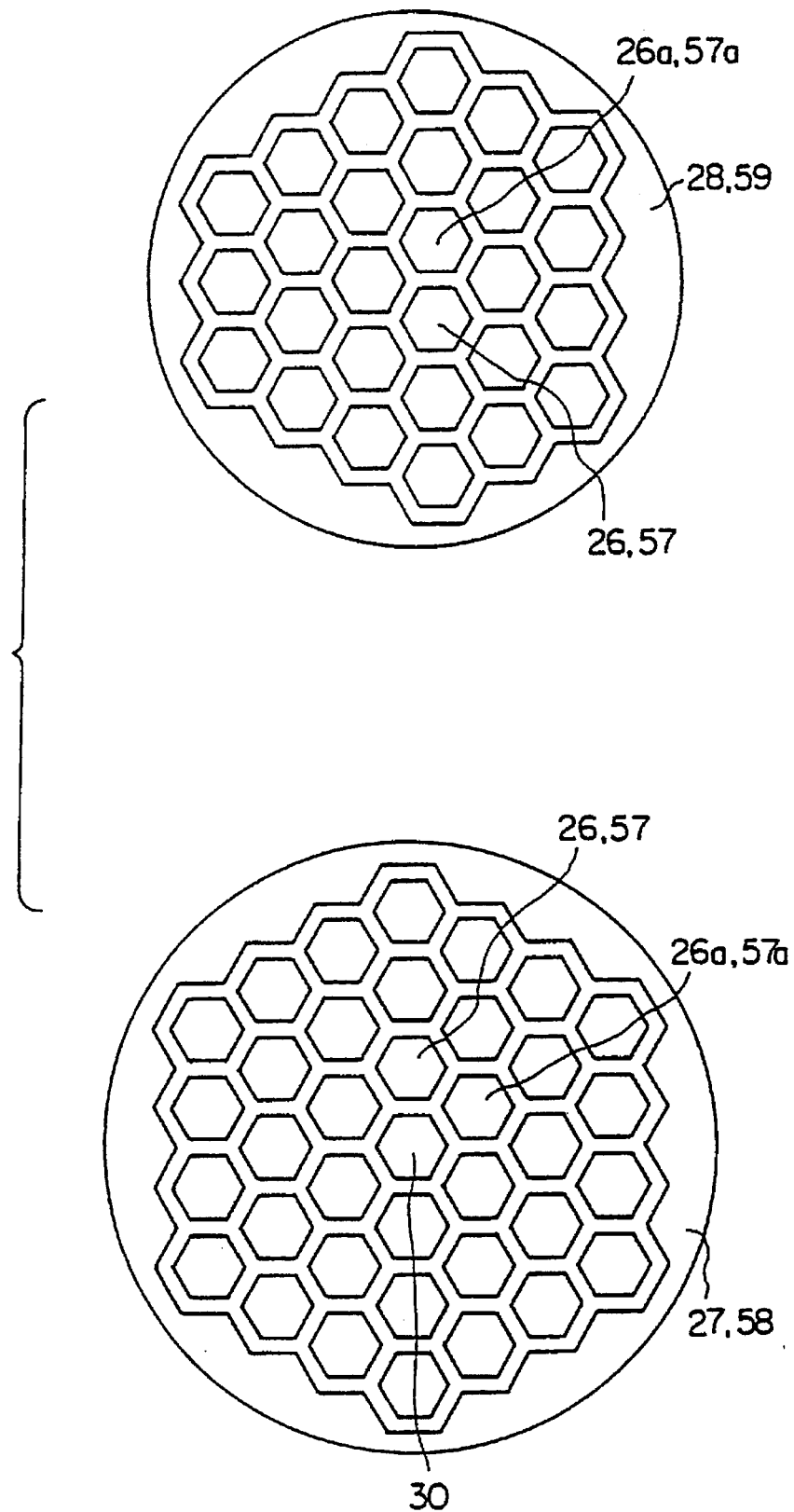
FIG. 6 is a front view of two heat transfer discs in the sterilizing apparatus.
Figure 8:
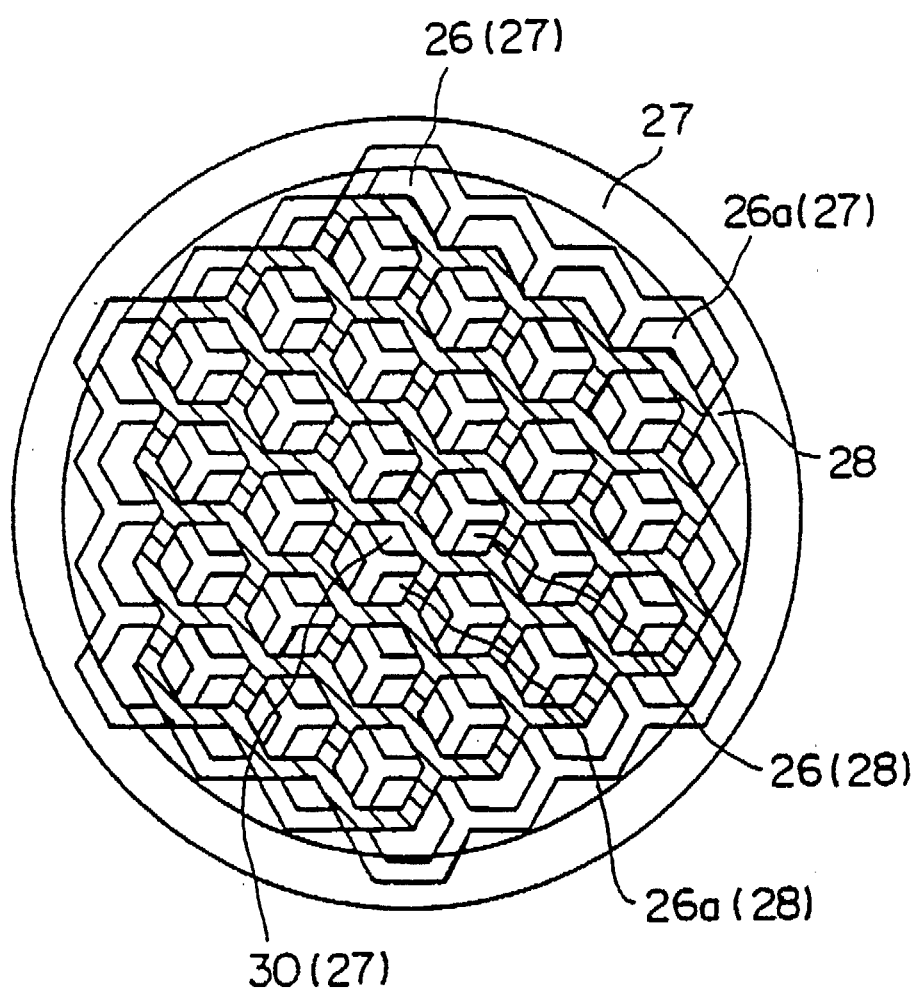
FIG. 8 is a view showing a state where small chambers are arranged so as to communicate with one another in case that the heat transfer discs are concentrically arranged so as to overlap with one another.

The heating element 16 comprises, as illustrated in FIGS. 6, 7 and 8, a pairs of heat transfer discs 27 and 28 each having a plurality of polygonal small chambers 26, 26a . . . thereon (as viewed in a plan view) which are open at fronts thereof, wherein the heat transfer discs 27 and 28 are coupled to each other face to face, and wherein the polygonal small chambers 26, 26a . . . are arranged radially and concentrically, and upper end surfaces 29a (see FIGS. 2 and 3) of the side walls 29 see FIGS. 2 and 3), which respectively concentrically form the polygonal small chambers 26, 26a . . . , are laid over the other with one another in close contact with one another.

As shown in FIG. 8, the heat transfer small chambers 26, 26a . . . of one heat transfer disc 27 and those of the heat transfer disc 28 are alternately arranged with one another so as to communicate with one another.

Either the heat transfer disc 27 or the transfer disc 28 has a circulation hole 30 formed at a center of the heat transfer disc 27 or 28, which hole 30 communicates with each of the small chambers 26, 26a . . . . When the heat transfer discs 27 and 28 are brought into contact with and laid over each other, circumferential openings 31 (see FIGS. 2–5) defined between the heat transfer discs 27 and 28 communicate with each of the small chambers 26, 26a . . . , so that the circumferential openings 31 finally communicate with the circulation hole 30.

Figure 9:
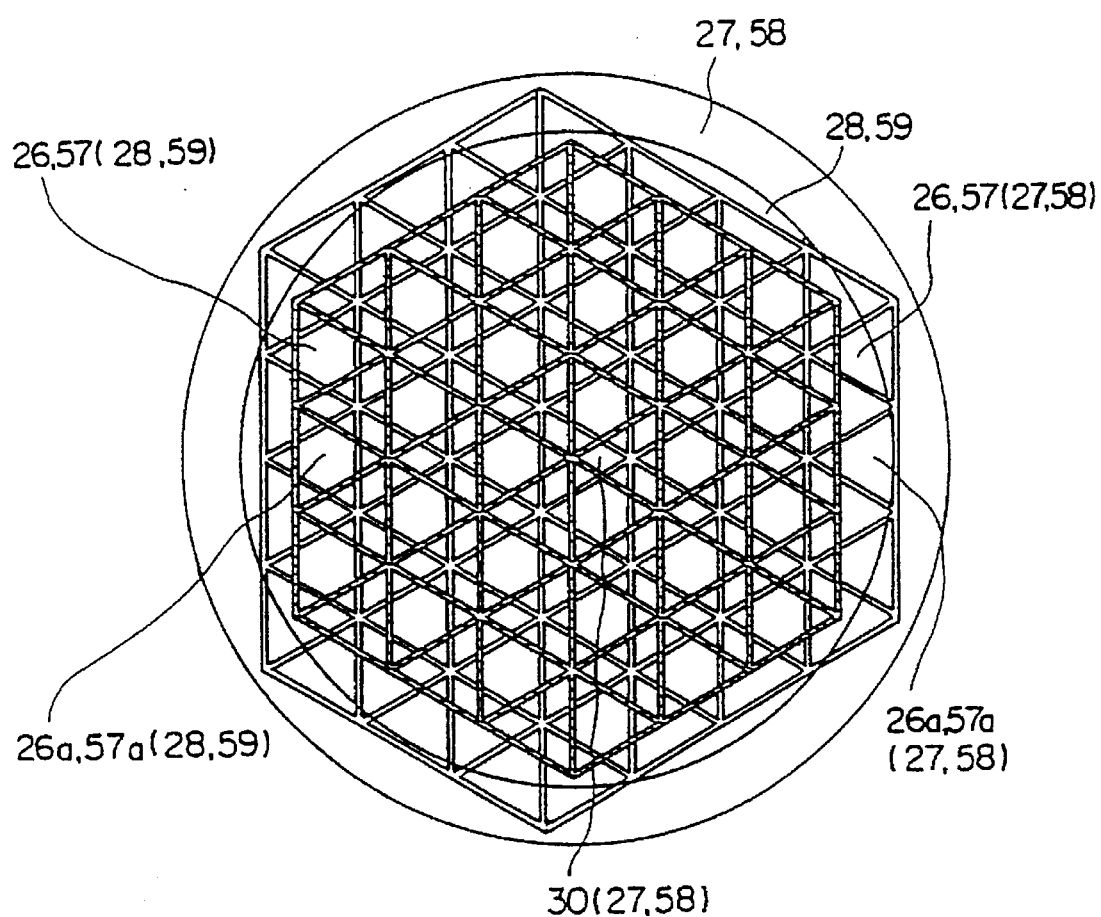
FIG. 9 is a view showing a state where small chambers each having a triangle shape are arranged to communicate with one another.
Figure 10:
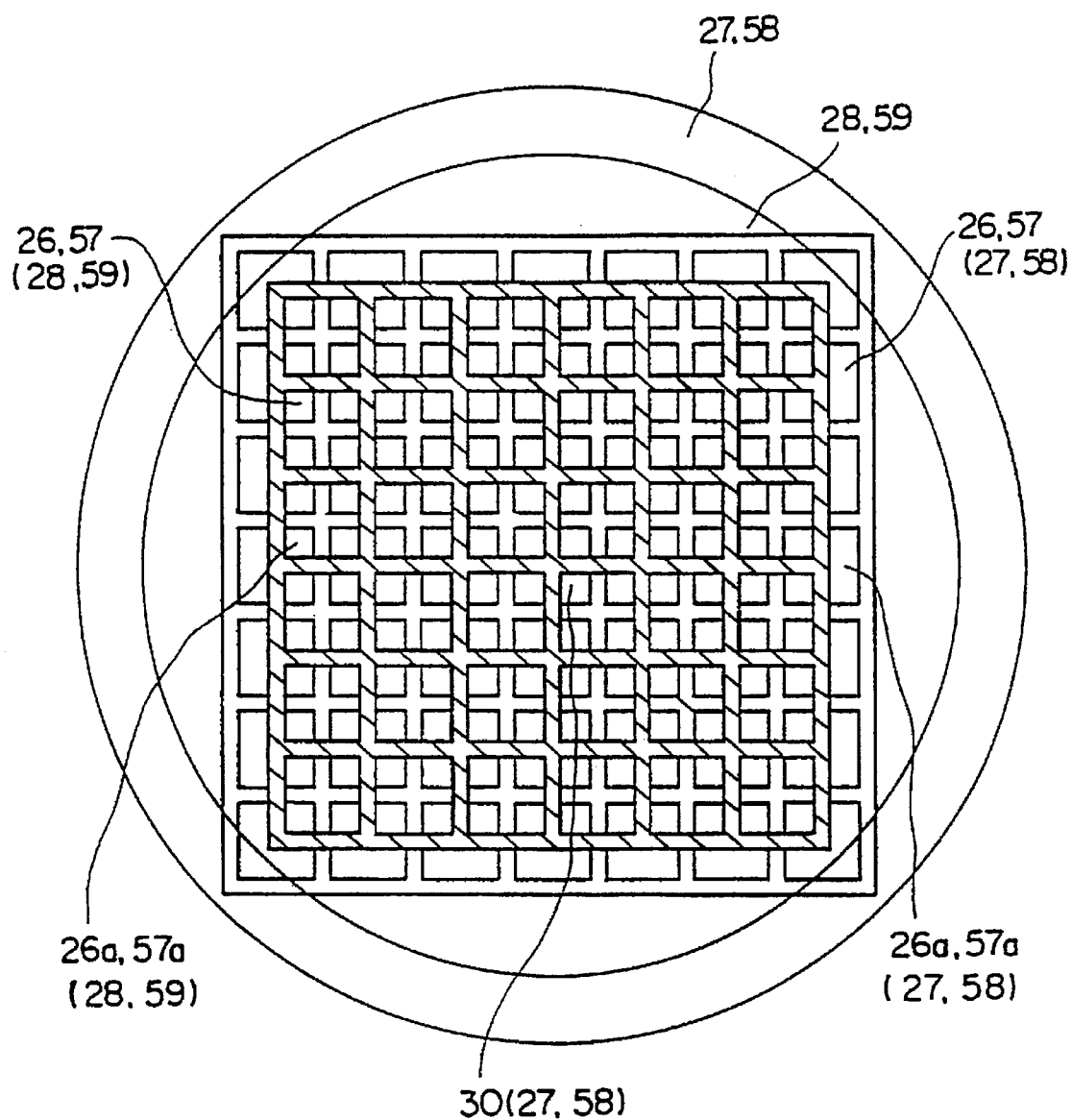
FIG. 10 is a view showing a state where small chambers each having a square shape are arranged to communicate with one another.
Figure 11:
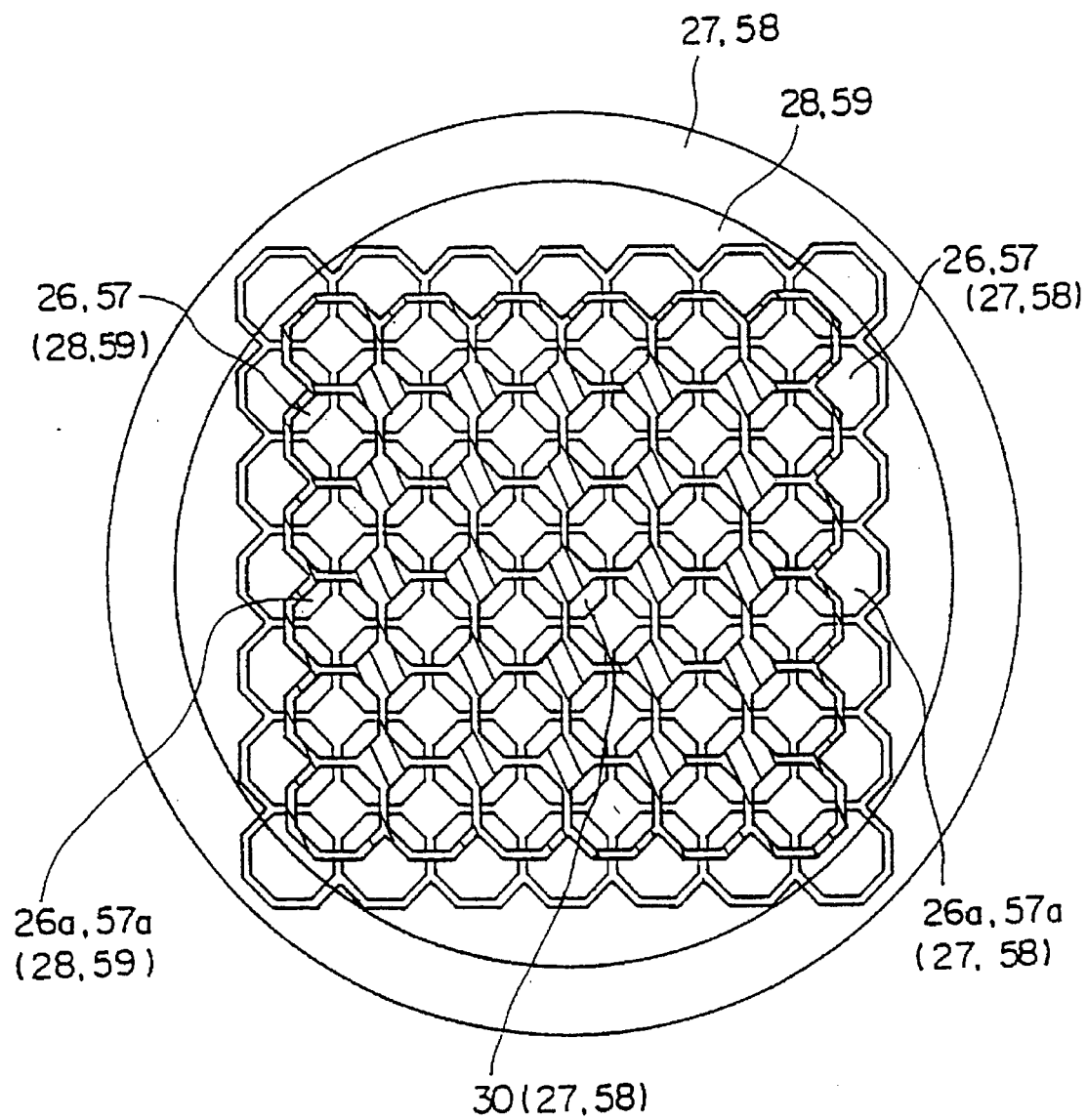
FIG. 11 is a view showing a state where small chambers each having an octagonal shape are arranged to communicate with one another.

In the first embodiment, the shape of the small chambers 26, 26a . . . are hexagonal in plan view and arranged in plural numbers in honeycomb shape, but it is not limited to the hexagonal but may be triangle, square, octagonal, etc. which however have the same function. For example, FIG. 9 shows a state where the small chambers each have a triangle shape, FIG. 10 shows a state where the small chambers each have a square shape, and FIG. 11 shows a state where the small chambers each have an octagonal shape.

When the cooling element 24 is formed substantially in the same manner as the heating element 16, component parts of the former can be commonly used with those of the latter. Whereupon, number of arrangement, internal capacities and materials respectively of the small chambers 26, 26a . . . of the heat transfer discs 27 and 28 can be appropriately changed depending on raw materials to be cooled.

The arrangement of the heating element 16 and the cooling element 24 to be provided inside the heating portion 8 and the cooling portion 9 are as follows. That is, the heat transfer disc 27 having the circulation hole 30 is confronted with the heat transfer disc 28 by way of the heat insulating material 10, wherein the circulation hole 30 of the heating element 16 serves as the first outlet 15 while the circulation hole 30 of the cooling element 24 serves as the second inlet 22, and the first outlet 15 and the second inlet 22 are connected to communicate with each other by the raw material connecting passage 18 which penetrated the heat insulating material 10.

The circumferential openings 31 between the heat transfer discs 27 and 28 in the heating element 16 disposed inside the heating portion 8 serve as the first inlet 14 to which one of the supply pipe 17 is connected so that the first inlet 14 communicates with the supply pipe 17, while circumferential openings 31 between the heat transfer discs 27 and 28 in the cooling element 24 disposed inside the cooling portion 9 serve as the second outlet 23 to which one end of the raw material discharge passage 25 is connected so that the second outlet 23 communicates with the raw material discharge passage 25.

Second Embodiment (FIG. 3)

FIG. 3 shows a second embodiment of the sterilizing apparatus 3, in which numerals denoted at the same elements as those of the first embodiment are denoted at the same numerals. This is also applied to other embodiments, described later.

In the second embodiment as shown in FIG. 3, the heat transfer disc 28 which does not form the circulation hole 30 is confronted with the heat transfer disc 27 by way of the heat insulating material 10, wherein the circulation hole 30 of the heating element 16 serves as the first inlet 14 to which one end of the supply pipe 17 is connected so that the first inlet 14 communicates with the supply pipe 17, while the circulation hole 30 of the cooling element 24 serves as second outlet 23 to which one end of the raw material discharge passage 25 is connected so that the second outlet 23 communicates with the raw material discharge passage 25.

The circumferential openings 31 between the heat transfer discs 27 and 28 in the heating element 16 disposed inside the heating portion 8 serve as the first outlet 15, while the circumferential openings 31 between the heat transfer discs 27 and 28 in the cooling element 24 serve as the second inlet 22 so that the second inlet 22 communicates with the first outlet 15 by the raw material connecting passage 18 which penetrates the heat insulating material 10.

The arranging relation between the heating casing 13 and the cooling element 24 can be appropriately changed by permitting the circulation hole 30 of the heating casing 13 to serve as the first inlet 14 or the first outlet 15 and by permitting the circulation hole 30 of the cooling element 24 to serve as the second inlet 22 or the second outlet 23.

In the heating means of the second embodiment, the heating element 16 is directly heated by heating medium such as steam, but it is not limited to such an arrangement, for example, electric heater, far-infrared heater, microwave heating apparatus, not shown, may be provided inside the heating casing 13 for heating e.g. the heating element 16.

The heat transfer discs 27 and 28 are not necessary to be formed large and small as described later.

Figure 4:
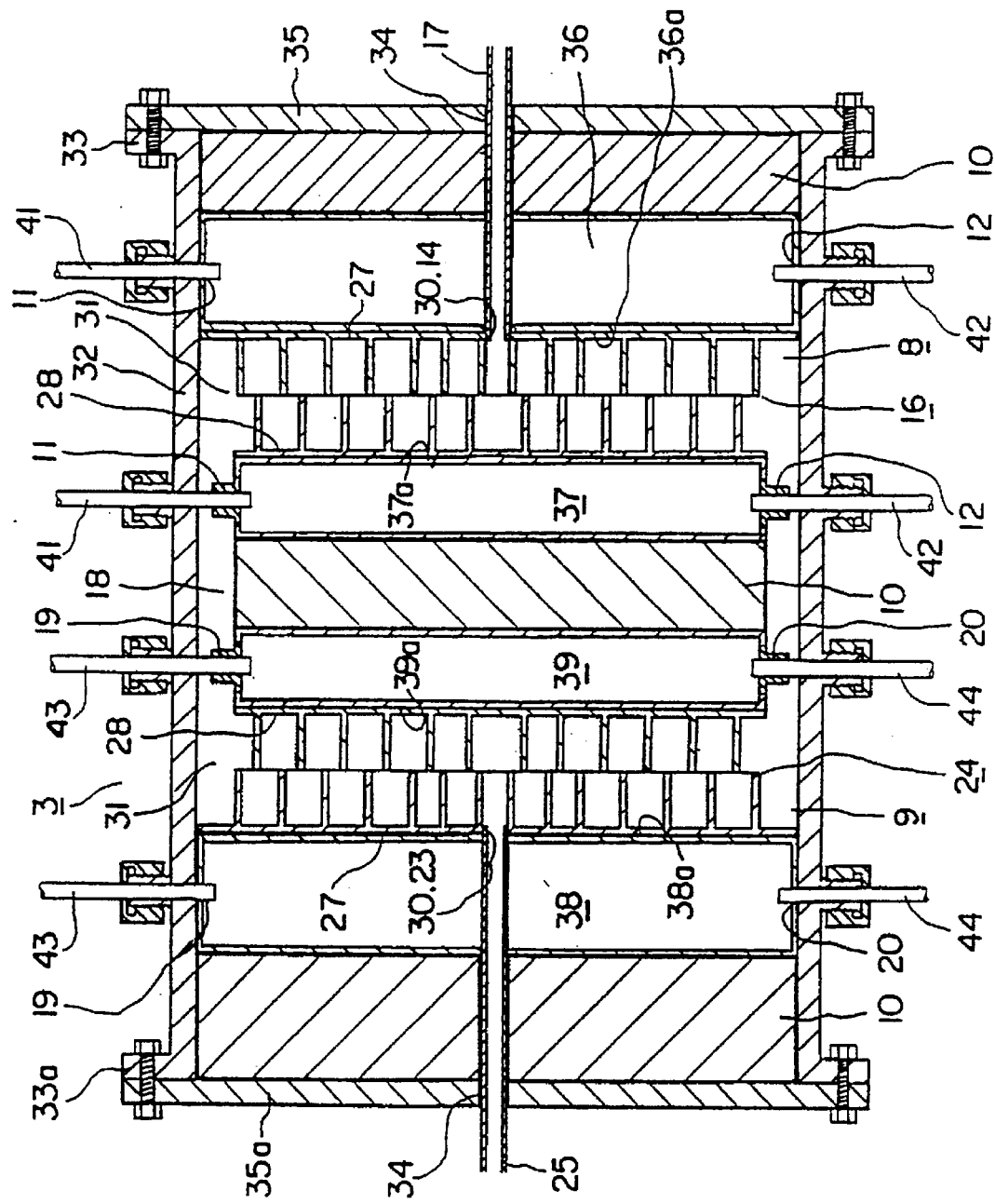
FIG. 4 is a schematic cross-sectional view of a sterilizing apparatus according to a third embodiment of the invention.
Figure 5:
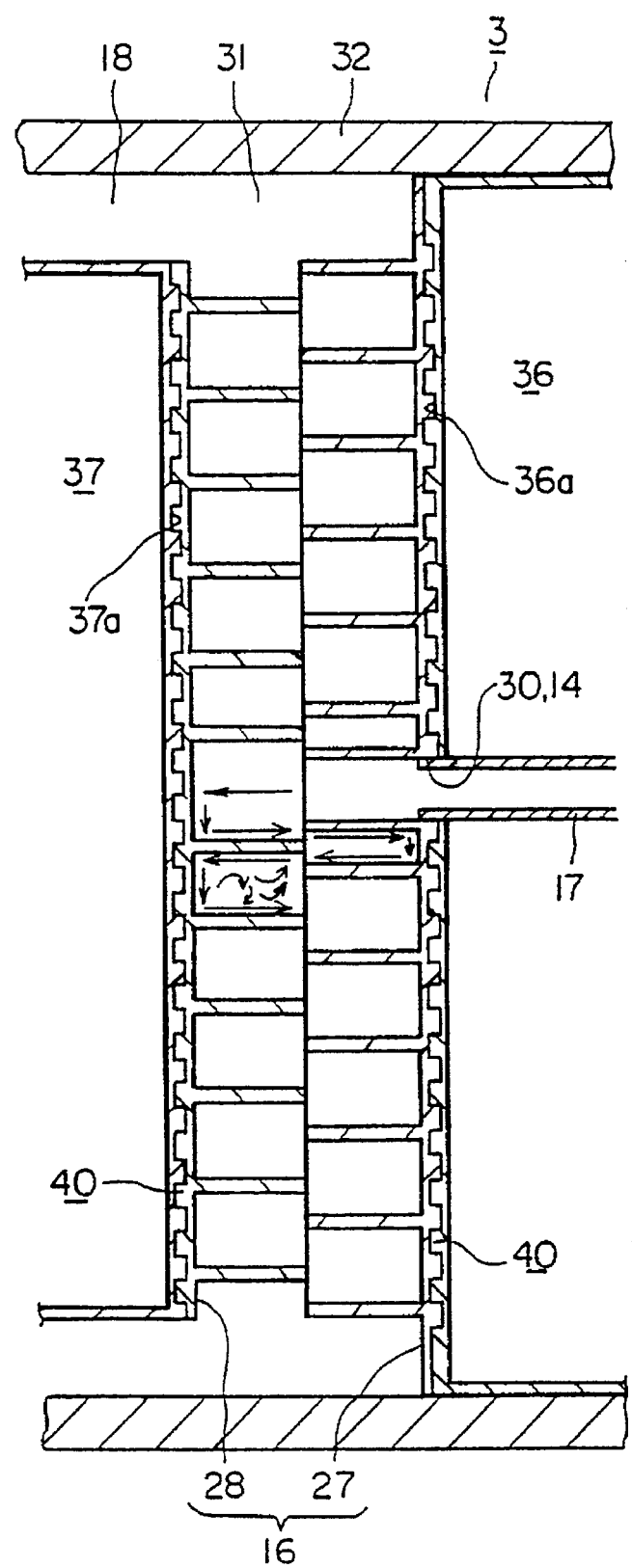
FIG. 5 is a schematic cross-sectional view of a sterilizing apparatus in FIG. 4, wherein a part thereof is omitted.

Third Embodiment (FIGS. 4 and 5)

FIGS. 4 and 5 show a third embodiment in the sterilizing apparatus 3. As shown in FIG. 4, flanges 33 and 33a, which respectively protrude in an outer peripheral direction, are formed at openings defined at both ends of a cylindrical casing 32, and cover bodies 35, 35a having through holes 34 are detachably mounted on the flanges 33 and 33a.

The heating portion 8 and the cooling portion 9 are provided inside the hollow inner portion of the casing 32, and the insulating materials 10 having elastic function are respectively circularly interposed between the heating portion 8 and the cover body 35 and between the heating portion 8 and the cooling portion 9, and between the cooling portion 9 and the cover body 35a.

The outer peripheral surfaces of the heat insulating materials 10 provided at both end sides of the hollow inner portion of the casing 32 are brought into contact with the inner peripheral surface of the casing 32, and the outer diameter of the heat insulating material 10 provided between the heating portion 8 and the cooling portion 9 is smaller than the inner peripheral surface of the casing 32.

An outer diameter of the heat transfer disc 27 forming the circulation hole 30 is greater than that of the heat transfer disc 28, and both peripheries of the heat transfer disc 27 are brought into watertightly contact with the inner peripheral surface of the casing 32, whereby the circumferential openings 31 of the heating element 16 and the circumferential openings 31 of the cooling element 24 communicate with each other in a hollow space of the casing 32 to form the raw material connecting passage 18.

A seal member such as a heat resistant O ring (not shown), may be used between the inner peripheral surface of the casing 32 and both peripheries of the heat transfer disc 27 having a large diameter (hereinafter referred to as larger diameter heat transfer disc 27).

A heat transfer surface 36a of a first heating chamber 36, which has an inner space and both peripheries thereof bringing into watertightly contact with the inner peripheral surface of the casing 32, is closely brought into contact with a rear surface of the larger diameter heat transfer disc 27. A heat transfer surface 37a of a second heating chamber 37, which has an inner space and an outer diameter which is smaller than the inner peripheral surface of the casing 32, is closely brought into contact with a rear surface of the heat transfer disc 28 having a small diameter (hereinafter referred to as smaller diameter heat transfer disc 28). The first and second heating chambers 36 and 37 constitute the heating portion 8 while interposing the heating element 16 therebetween.

A heat transfer surface 38a of a first cooling chamber 38, which is formed likewise the first heating chamber 36, is closely brought into contact with a rear surface of the larger diameter heat transfer disc 27 of the cooling element 24, while a heat transfer surface 39a of a second cooling chamber 39, which is formed likewise the second heating chamber 37, is closely brought into contact with a rear surface of the smaller diameter heat transfer disc 28 of the cooling element 24. The first and second cooling chambers 38 and 39 constitute the cooling portion 9 while interposing the cooling element 24.

The closely contacting surfaces between the rear surfaces of the larger and smaller diameter heat transfer discs 27 and 28 of the cooling element 24 and the heat transfer surface 38a of the first cooling chamber 38 and the heat transfer surface 39a of the second cooling chamber 39, and between the rear surfaces of the heat transfer discs 27 and 28 of the heat element and the heat transfer surface 36a of the first heating chamber 36 and the heat transfer surface 37a of the second heating chamber 37, are formed convex or concave in either surface thereof for enhancing heat transfer efficiency as shown in FIG. 5. Such concave and convex portions 40 are preferable to be closely contact with one another.

A through hole 34 of the cover body 35 of the casing 32, and one end of the supply pipe 17 penetrating the heat insulating material 10 are respectively connected so as to communicate with the first inlet 14 serving as the circulation hole 30 of the larger diameter heat transfer disc 27 in the heating element 16. A through hole 34 of the cover body 35a of the casing 32, and one end of the raw material discharge passage 25 penetrating the heat insulating material 10 are respectively connected so as to communicate with the second outlet 23 serving as the circulation hole 30 of the larger diameter heat transfer disc 27 in the cooling element 24.

The first cooling chamber 38, the second cooling chamber 39, the first heating chamber 36, and the second heating chamber 37 have the cooling medium inlet 19, the cooling medium outlet 20, the heating medium inlet 11, and the heating medium outlet 12. A heating medium supply pipe 41, a heating medium discharge pipe 42, a cooling medium supply pipe 43, and a cooling medium discharge pipe 44, which respectively penetrate the casing 32, are connected so as to communicate with the heating medium inlet 11, the heating medium outlet 12, the cooling medium inlet 19 and the cooling medium outlet 20 by way of detachable coupler, not shown.

It is a matter of course that seal members, not shown, or heat insulating bodies, not shown, are employed in portions which require water tightness and heat insulation between the constitutional members.

Figure 12:
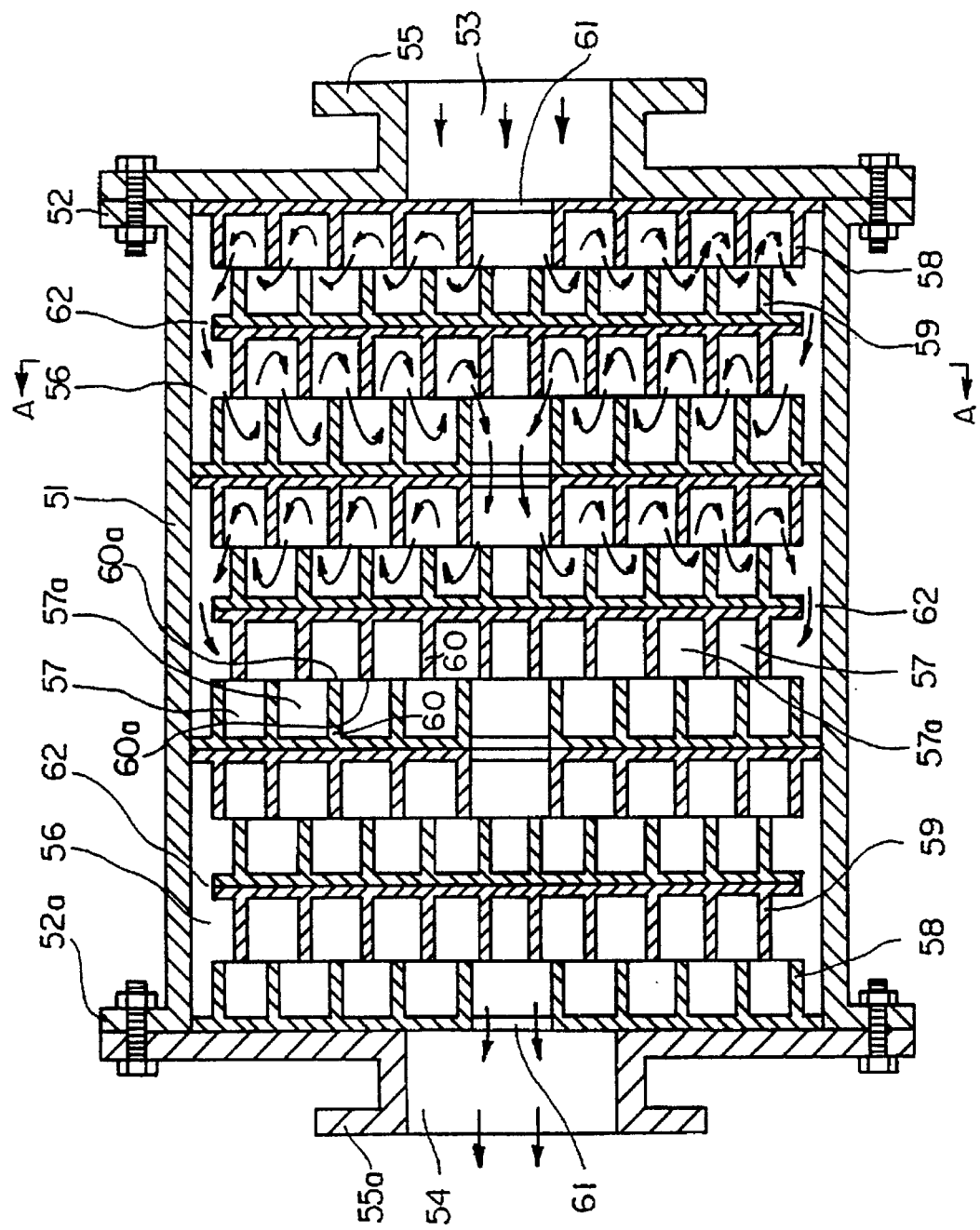
FIG. 12 is a schematic cross-sectional view of a fluid mixing apparatus.

The fluid mixing apparatus 4 as shown in FIG. 12 includes collars 52 and 52a respectively projecting in the circumferential direction are formed at both end openings of a cylindrical vessel 51. A cap body 55 having an inlet 53 and a cap body 55a having an outlet 54 are respectively detachably mounted on the collars 52 and 52a.

Denoted at 56 is a plurality of mixing elements which are arranged at the hollow space of the vessel 51. The mixing elements 56 comprise a pairs of larger and smaller diameter mixing discs 58 and 59 each having a plurality of polygonal small chambers 57, 57a . . . thereon (as viewed in a plan view) which are open at fronts thereof, wherein the larger and smaller diameter mixing discs 58 and 59 are coupled to each other face to face, and wherein the polygonal small chambers 57, 57a . . . are arranged radially and concentrically, and upper ends surfaces 60a of the side walls 60, which respectively concentrically form the polygonal small chambers 57, 57a . . . , are laid over each other in close contact therewith.

Figure 13:
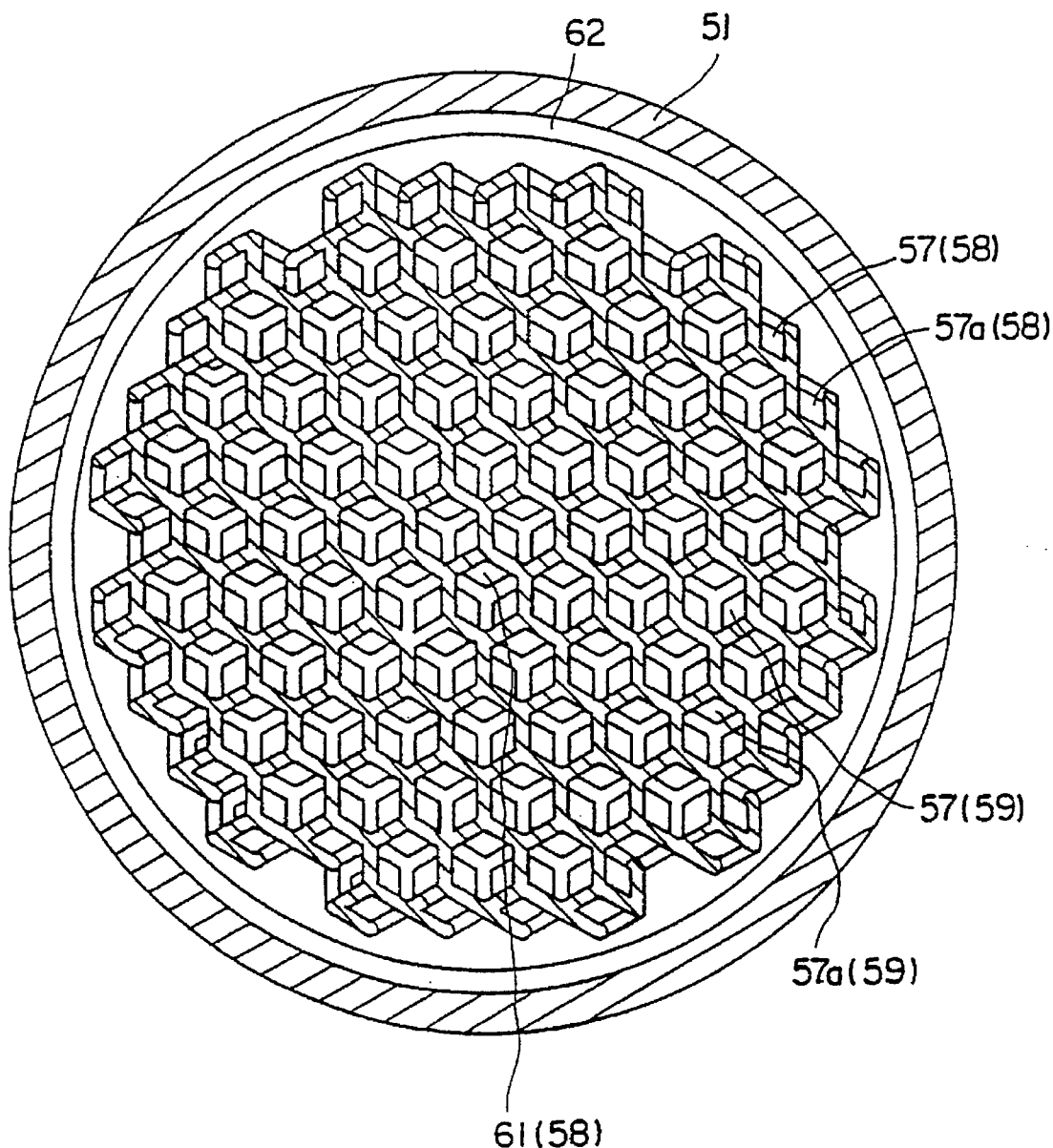
FIG. 13 is a schematic cross-sectional view of the fluid mixing apparatus taken along A—A in FIG. 12.

As shown in FIG. 13, the heat transfer small chambers 57, 57a . . . of one mixed disc 58 and those of the heat transfer disc 59 of the small diameter mixing disc 59 are confronted with one another and are alternately arranged with one another so as to communicate with one another.

The mixed disc 58 having a large diameter (hereinafter referred to as larger diameter mixed disc 58) is brought into contact with an inner peripheral surface of the vessel 51 at both peripheries thereof, and has an opening 61 at the center thereof, while both peripheries of the mixed disc 59 having a small diameter (hereinafter referred to as smaller diameter mixed disc 59) are spaced from the inner peripheral surface of the vessel 51 and a circulation passage 62 is defined between the smaller diameter mixed disc 59 and the inner peripheral surface of the vessel 51.

The polygonal small chambers 57, 57a . . . of the fourth embodiment have shapes like the heat transfer discs 27 and 28 of the sterilizing apparatus 3.

These mixing elements 56 (see FIGS. 12 and 14) are laid over the other with one another so as to be adjacent to one another and disposed in sequence at the inner space of the vessel 51.

The larger diameter mixed disc 58 is disposed at both sides of the vessel 51 so that the inlet 53 and the outlet 54 confront with each other.

Figure 14:
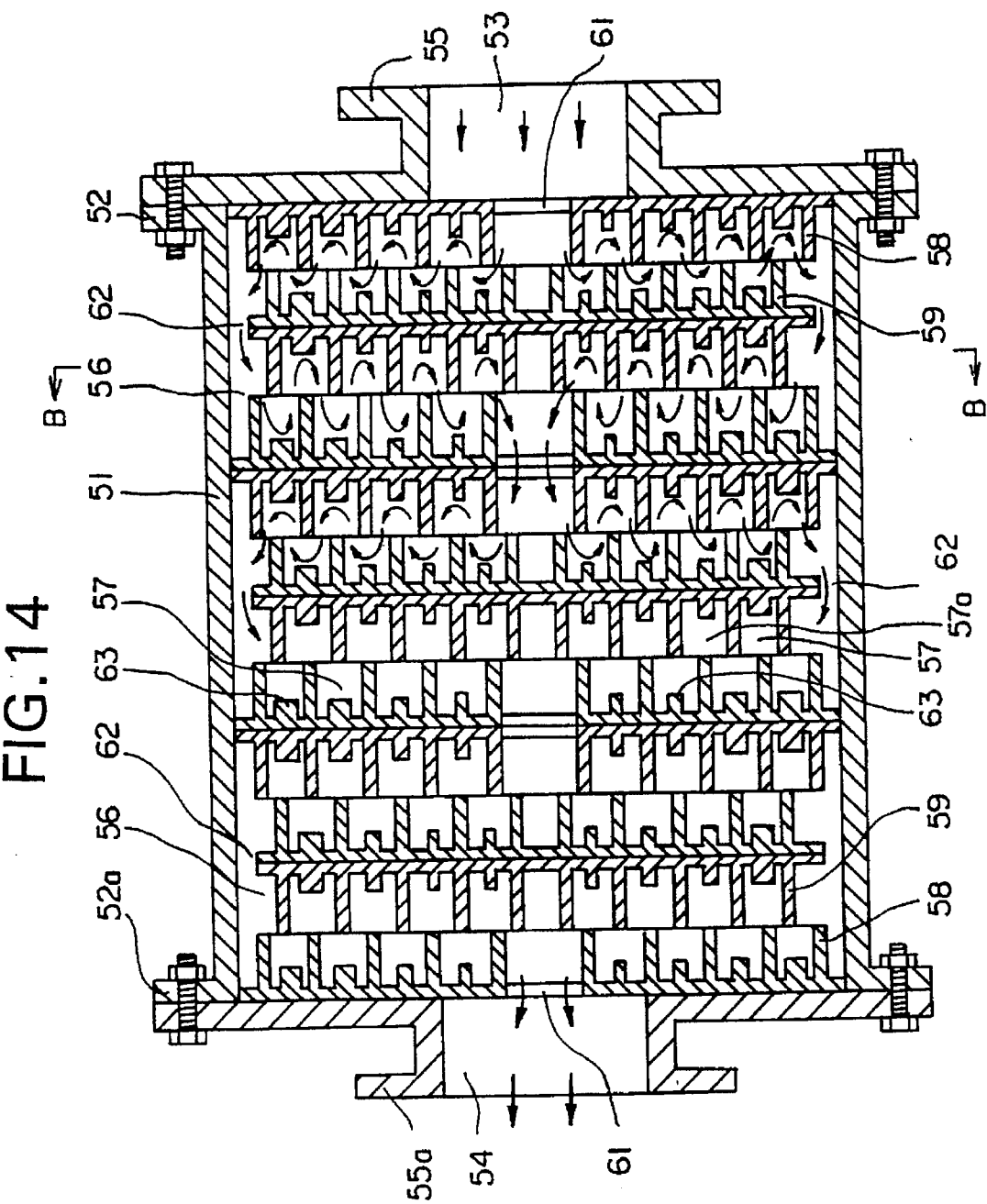
FIG. 14 is a schematic cross-sectional view of a fluid mixing apparatus according to a modification of FIG. 12.

FIGS. 14 and 15 show a modification of the fluid mixing apparatus 4. Projections 63, which are shorter than the height of the side walls 60 forming the polygonal small chambers 57, 57a . . . , are provided at central bottom surfaces of the polygonal small chambers 57, 57a . . . with the exception of central portions of the larger and smaller diameter mixing discs 58 and 59 constituting the mixing elements 56. As a result, fluid can be positively disturbed so as to further enhance a mixing efficiency. Further, when the projections 63 are gradually smaller as they approach to the central portion of the larger and smaller diameter mixing discs 58 and 59, capacities of each of the polygonal small chambers 57, 57a . . . are equalized, and pulse motion can be prevented so as to assure a smooth flow of the fluid.

An operation of the sterilizing apparatus 3 for the liquefied product will be now described as follows. Firstly, the raw material is previously sterilized and then the manufacturing apparatus 1 for the liquefied product is used for sterilizing an outer surface of the container to be packed, secondly, the raw material which is obtained by being subjected to various steps is accommodated in the raw material storing tank 2, thirdly, the same product is supplied from the inlet of the sterilizing apparatus 3 by way of the pump 6, wherein the raw material is subjected to the sterilization at high temperature and cooling, and homogenization during the passage inside the sterilizing apparatus 3, and fourthly, the raw material is accommodated in the product storing tank 5 in an inert atmosphere, and lastly, the raw material is supplied to a packing step such as bottling and cunning through a discharge port 5a of the product storing tank 5.

In liquefied products comprising a plurality of raw materials which are mixed with one another, each raw material which passed each sterilizing apparatus 3 is once accommodated in the intermediate chamber 7b, and then each raw material is supplied from the inlet of the fluid mixing apparatus 4 into the fluid mixing apparatus 4 wherein the raw materials are uniformly mixed with one another during the passage of the fluid mixing apparatus 4, and the uniformly mixed raw materials are accommodated in the product storing tank 5.

Since preceding steps ranging from sterilizing of the liquefied product to packing of the liquefied product are formed of a closed system, secondary contamination by bacilli can be prevented.

An operation of the sterilizing apparatus 3 will be now described.

When the raw materials, which entered from the first inlet 14 of the heating element 16, which is controlled to be heated at an appropriate temperature (at least 100° C.) by the heating means such as the heating casing 13, enter from and pass through the circulation hole 30 of the heat transfer disc 27, they strike against the bottom surfaces of the small chambers 26, 26a . . . at right angles thereto, which are located at the center of the smaller diameter heat transfer disc 28, so that they are blocked in their flowing route and changed in its flowing direction. Thereafter, the raw materials strike against the side walls 29 of the small chambers 26, 26a . . . at right angles thereto so that they are again blocked in their flowing route and changed in its flowing direction, then they pass through small chambers 26, 26a . . . which communicate with one another, and finally they flow from the central small chambers 26, 26a . . . thereof to the outside while they are subjected to striking, dispersing, joining, meandering, swirling and mixing with one another.

When the raw materials enter from the circumferential openings 31 between the larger diameter heat transfer disc 27 and the smaller diameter heat transfer disc 28, they strike against the bottom surfaces of the small chambers 26, 26a . . . at right angles thereto, which are located at the outermost column in the larger diameter heat transfer disc 27, so that they are blocked in their flowing route and changed in its flowing direction. Thereafter, they strike against the side walls 29 of the small chambers 26, 26a . . . at right angles thereto so that they are again blocked in their flowing route and changed in its flowing direction, then they pass through the small chambers 26, 26a . . . which communicate with one another, and finally they flow centripetally from the outside toward the center thereof while they are subjected to striking, dispersing, joining, meandering, swirling and mixing with one another.

In such a manner, when the raw materials pass between two heat transfer discs 27 and 28, they are repeatedly subjected to striking, dispersing, joining, meandering, swirling and mixing with one another, so that heat transfer operation by the present sterilizing apparatus is performed with high efficiency beyond comparison with the heat transfer operation by the prior art sterilizing apparatus, and further the heat transfer can be performed smoothly by the sterilizing apparatus of the present invention.

The raw materials are subjected to striking against the bottom surfaces and the side walls of each small chambers 26, 26a . . . at right angles therewith, subjected to dispersing, joining, meandering from each small chambers 26, 26a . . . to a plurality of other small chambers 26, 26a . . . , subjected to dynamic shearing due to swirling and mixing with one another when they enter from the plurality of small chambers 26, 26a . . . to each of the small chambers 26, 26a . . . , subject to dynamic shearing when they pass through orifices serving as the communicating passages through which the raw materials flow from each of the small chambers 26, 26a . . . to each of the other small chambers 26, 26a . . . , subjected to smashing into pieces due to shocking destruction thereof, subjected to shearing when they pass through the upper end surfaces 29a of the side walls 29, subjected to homogenization due to mechanical cavitation, etc. which are all simultaneously performed with the heat transfer.

The raw materials introduced from the second inlet 22 of the cooling element 24, which is controlled to be cooled at low temperature by the cooling means such as the cooling casing 21, are also subjected to heat transfer operation and homogenizing operation due to such striking, dispersing, joining, meandering, swirling and mixing.

Time required for the raw material to pass through the heating element 16 and the cooling element 24 is 1/100 second supposing that total capacities of the small chambers 26, 26a . . . are 10 cm$^3$, and quantity of flow of the raw materials is 60 l/min., and it can be appropriately varied.

Total number of dispersion of the heating element 16 and the cooling element 24 is determined by the number of small chambers 26, 26a . . . which are arranged sequentially radially from the centers of the transfer discs 27 and 28. For example, in the hexagonal small chambers 26, 26a . . . in FIG. 8, the heat transfer disc 27 having 6 chambers in a first column, 12 chambers in a second column, 18 chambers in a third column (36 chambers in three columns) are laid over the heat transfer disc 28 having 3 chambers in a first column, 9 chambers in a second column, 15 chambers in a third column (27 chambers in three columns), so that total number of dispersion of the heating element 16 and the cooling element 24 reaches several thousands.

The total number of dispersion means the number of dispersion of the raw materials which should be performed while the raw materials pass through the small chambers 26, 26a . . . , which communicate with one another, of the heat transfer discs 27 and 28 in the heating element 16 and the cooling element 24. In case of the sterilizing apparatus 3 comprising the heating element 16 and the cooling element 24, total number of dispersion becomes a product of each total number of dispersion of the heating element 16 and that of the cooling element 24, and this can be appropriately varied by increasing or decreasing the number of arranging columns of the small chambers 26, 26a . . . and depending on the nature of the raw materials.

An operation of the fluid mixing apparatus 4 will be now described.

The mixing elements 56 of the fluid mixing apparatus 4 are formed like the heating element 16 and the cooling element 24 of the sterilizing apparatus 3, so that the raw materials are subjected to the sterilization by a plurality of sterilizing apparatus 3, accommodated once in the intermediate chamber 7b, then flow from the inlet 53 of the vessel 51 inside the mixing elements 56 through the opening 61 of the larger diameter mixing disc 58 in the mixing elements 56 located upstream. Thereafter, the raw materials pass through the plurality of mixing small chambers 57, 57a . . . which communicate with one another like the sterilizing apparatus 3, then they flow while they are subjected to striking at right angles, dispersing, joining, meandering, swirling and mixing with one another, thereafter they pass through the circulation passage 62 defined between both peripheries of the smaller diameter mixing disc 59 and the inner peripheral surface of the vessel 51, and finally they enter the mixing small chambers 57, 57a . . . from the outside of the mixing elements 56, namely, from the circulation passage 62. Thereafter, the raw materials pass through, in the same manner as mentioned above, the small chambers 57, 57a . . . which communicate with one another, and finally they flow centripetally from the outside toward the center thereof while they are subjected to striking, dispersing, joining, meandering, swirling and mixing with one another, and finally they are discharged from the outlet 54 of the vessel 51 through the opening 61 of the mixing elements 56 located downstream.

It is a matter of course that in case of the dispersion of the fluid mixing apparatus 4, the dispersion of each of the mixing elements 56 increases exponentially depending on the number of mixing elements 56 and the number of fluid of the raw materials like the sterilizing apparatus 3.

Since the sterilizing apparatus 3 comprises a heating portion 8 comprising a first inlet 14 through which a raw material to be heated is introduced, and a first outlet 15 through which a heated raw material is discharged, and a heating element 16 which is controlled to be heated, a cooling portion 9 comprising a second inlet 22 through which a raw material to be cooled is introduced, and a second outlet 23 through which a cooled raw material is discharged, and a cooling element 24 which is controlled to be cooled, a raw material connecting passage 18 for connecting the first outlet 15 and the second inlet 22 so that the first outlet 15 communicates with the second inlet 22, wherein the heating element 16 and the cooling element 24 concentrically comprises each pair of heat transfer discs 27 and 28 having a plurality of polygonal small chambers 26, 26a . . . thereon which are open at fronts thereof, in each pair the heat transfer discs 27 and 28 being coupled to each other face to face, wherein the small chambers 26 of one heat transfer disc 27 are alternately arranged with the small chambers 26a of the other heat transfer disc 28 so as to communicate with one another, and either the heat transfer disc 27 or 28 has a circulation hole 30 formed at a center of either the heat transfer disc 27 or 28, wherein a circulation hole 30 of the heating element 16 serves as the first inlet 14 or the first outlet 15, and the circulation hole 30 of the cooling element 24 serves as the second inlet 22 or the second outlet 23, wherein circumferential openings 31 defined between the heat transfer discs 27 and 28 in the heating element 16 serve as the first inlet 14 and the first outlet 15, and circumferential openings 31 defined between the heat transfer discs 27 and 28 in the cooling element 24 serve as the second inlet 22 and the second outlet 23, in which the first outlet 15 and the second inlet 22 are connected by a raw materal connecting passage 18 so as to communicate with each other, when the raw materials pass through the between two heat transfer discs 27 and 28 in the heating element 16 and in the cooling element 24, they are repeatedly subjected to striking at right angles, dispersing, joining, meandering, swirling and mixing with one another so that the heat transfer is enhanced with high efficiency beyond comparison with that of the prior art plate type sterilizing apparatus. Further, the raw materials has no irregularity in its temperature distribution during the flowing thereof and can flow while maintaining a constant temperature distribution. Still further, the quantity of the fluid which does not contact with the heat transfer surface can be reduced so that the heat can be smoothly transmitted to the entire of the raw materials, which permits the raw materials to pass at high temperature with short time. As a result, it is effective for the sterilization, and further the heating time can be reduced so that the loss of fragrant components can be reduced.

Since the raw materials are subjected to striking against the bottom surfaces and the side walls of each small chambers 26, 26a . . . at right angles therewith, subjected to dispersing, joining, meandering from each small chambers 26, 26a . . . to a plurality of other small chambers 26, 26a . . . , subjected to dynamic shearing due to swirling and mixing with one another when they enter from the plurality of small chambers 26, 26a . . . to each of the small chambers 26, 26a . . . , subject to dynamic shearing when they pass through the orifices serving as the communicating passages through which the raw materials flow from each of the small chambers 26, 26a . . . each of the other small chambers 26, 26a . . . , subjected to smashing into pieces due to shocking destruction thereof, subjected to shearing when they pass through the upper end surfaces 29a of the side walls 29, subjected to homogenization due to mechanical cavitation, etc. which are all simultaneously performed with the heat transfer, it is possible to homogenize the raw materials by smashing the fats of the milk, soy bean milk, lactic acid beverage, etc. and fibers of the vegetable juice, which dispenses with homogenizing step by the homogenizer which was needed in the prior art sterilizing apparatus, and which also improves the quality of homogenization because of the total number of the dispersion is very large.

Since the heating portion 8 forms a heating casing 13 which is partitioned at an inner space thereof by divided casings 13a and 13b, and has a heating source and the heating element 16 in the inner space thereof, and the cooling portion 9 forms a cooling casing 21 which is partitioned at an inner space thereof by divided casings 21a and 21b, and has a cooling source and the cooling element 24 in the inner space thereof, it is possible to heat the heating element 16 as a whole and cool the cooling element 24 as a whole. Further, since each casing is formed by each of the divided casings 13a, 13b, 21a, and 21b, it is possible to easily perform the maintenance such as disassembly and cleaning of the heating element 16 and the cooling element 24.

Since the cover bodies 35 and 35a respectively having through holes 34 are detachably mounted on both end side openings of a cylindrical casing 32, a heat insulating material 10 is interposed between the heating portion 8 and the cooling portion 9 respectively provided in the casing 32, the heating portion 8, the cooling portion 9 and the heat insulating materials 10 as the internal constitutions of the casing 32 can be taken out by removing the cover bodies 35 and 35a, which makes it possible to perform maintenance such as disassembly and cleaning of the casing 32. Further, since the outer diameter of the heat insulating materials 10 is smaller than the inner peripheral surface of the casing 32, a gap between the circumferential surface of the heat insulating materials 10 and the inner peripheral surface of the casing 32 can serve as the raw material connecting passage 18, which makes it possible to simplify the communicating mechanism between the first outlet 15 of the heating element 16 and the second inlet 22 of the cooling element 24.

Since the first heating chamber 36, which is controlled to be heated, is brought into contact with the rear surface of the larger diameter heat transfer disc 27 of the heating element 16 in the heating means, and the second heating chamber 37, which is controlled to be heated, is brought into contact with the rear surface of the smaller diameter heat transfer disc 28, while first cooling chamber 38, which is controlled to be cooled, is brought into contact with the rear surface of the larger diameter heat transfer disc 27 of the cooling element 24 in the cooling means, and the second cooling chamber 39, which is controlled to be cooled, is brought into contact with the rear surface of the smaller diameter heat transfer disc 28, of the cooling element 24 in the cooling means, these heating and cooling means can be disposed concentrically in series in the inner space of the casing 32. Accordingly, if the heat insulating materials 10 have an elastic function, jolt which occurs when the close contact with the first and second heating chambers 36 and 39 with the larger and smaller diameter heat transfer discs 27 and 28 can be prevented by elastic restoring force which is generated when the cover bodies 35 and 35a are mounted on both openings of the casing 32, so that loss of heat transfer from each chamber to the heating element 16 and the cooling element 24 can be prevented.

Since the first concave and convex portions 40 are formed at portions where the first and second heating chambers 36 and 37 are brought into contact with the rear surfaces of the heat transfer discs 27 and 28 of the heating element 16, and second concave and convex portions 40 are formed at portions where the first and second cooling chambers 38 and 39 are brought into contact with the rear surfaces of the heat transfer discs 27 and 28 of the cooling element 24, it is possible to improve the heat transfer efficiency between each chamber and the heating element 16 and the cooling element 24.

Since the manufacturing apparatus of liquefied product comprises a raw material storing tank 2 for storing raw materials to be subjected to sterilization, and a product storing tank 5 for storing sterilized raw material, wherein the product storing tank 5 is in an inert atmosphere at an inner portion thereof, and wherein the raw material storing tank 2 and the product storing tank 5 are connected to each other by way of supply pipe passages 7 and 7a so as to permit the raw material storing tank 2 to communicate with the product storing tank 5, and wherein a pump 6 is provided upstream relative to the raw material storing tank 2, and the sterilizing apparatus 3 is provided at downstream relative to the pump 6, the raw material which was sterilized by the sterilizing apparatus 3 can be supplied to the product storing tank 5 through the supply pipe passages 7 and 7a. Further, since the storing tank 5 is in an inert atmosphere at an inner portion thereof, it is possible to establish a closed system for the preceding steps ranging from sterilizing of the product to packing of the product, secondary contamination of the sterilized product by bacilli can be prevented with assurance.

Since the raw material storing tank 2 and the sterilizing apparatus 3 connected to and communicate with the raw material storing tank 2 by way of the supply pipe passages 7 and 7a are plural in numbers, an intermediate chamber 7b is provided between the product storing tank 5 and the sterilizing apparatus 3 for storing sterilized raw materials which are discharged from each of the sterilizing apparatus 3, a fluid mixing apparatus 4 provided on the passage 7a between the intermediate chamber 7b and the product storing tank 5 for mixing a plurality of fluids, a plurality of sterilized products can be mixed with one another while maintaining the closed system for preventing contamination of bacilli in the same way as mentioned above, which leads to a very great practical effect.

What is claimed is:

1. A sterilizing apparatus comprising:

a heating portion comprising a heating element having a first inlet through which a raw material to be heated is introduced, and a first outlet through which a heated raw material is discharged, and a heating means for heating said heating element;

a cooling portion comprising a cooling element having a second inlet through which a raw material to be cooled is introduced, and a second outlet through which a cooled raw material is discharged, and a cooling means for cooling said cooling element;

a raw material connecting passage for connecting said first outlet and said second inlet so that said first outlet communicates with said second inlet;

wherein said heating element and said cooling element each concentrically comprises a pair of heat transfer discs having a plurality of polygonal chambers thereon which are open at fronts thereof, in each pair said heat transfer discs being coupled to each other face to face, wherein said chambers of one heat transfer disc are alternately arranged with said chambers of the other heat transfer disc so as to communicate with one another, and either of said heat transfer discs of each pair has a circulation hole formed at a center thereof;

wherein said circulation hole of said heating element serves as said first inlet or the first outlet, and said circulation hole of said cooling element serves as said second inlet or said second outlet; and wherein circumferential openings defined between said heat transfer discs in said heating element serve as said first inlet and said first outlet, and circumferential openings defined between said heat transfer discs in said cooling element serve as said second inlet and said second outlet, in which said first outlet and said second inlet are connected by said raw material connecting passage so as to communicate with each other.

2. A sterilizing apparatus according to claim 1, wherein said heating portion includes a heating casing which is partitioned at an inner space thereof by divided casings, and has a heating source and said heating element in said inner space thereof, and wherein said cooling portion forms a cooling casing which is partitioned at an inner space thereof by divided casings, and has a cooling source and said cooling element in said inner space thereof.

3. A sterilizing apparatus comprising:

a cylindrical casing having openings at both ends thereof;

cover bodies respectively having through holes detachably mounted on said openings of said cylindrical casing;

a heating portion comprising a heating element having a first inlet through which a raw material to be heated is introduced, and a first outlet through which a heated raw material is discharged, and a heating means for heating said heating element;

a cooling portion comprising a cooling element having a second inlet through which a raw material to be cooled is introduced, and a second outlet through which a cooled raw material is discharged, and a cooling means for cooling said cooling element;

a heat insulating material interposed between said heating portion and said cooling portion respectively provided in said casing, an outer diameter of said heat insulating material being smaller than an inner peripheral surface of said casing;

wherein said heating element and said cooling element each concentrically comprises a pair of larger and smaller diameter heat transfer discs having a plurality of polygonal chambers thereon which are open at fronts thereof, in each pair said larger and smaller diameter heat transfer discs being coupled to each other face to face, wherein said chambers of said larger and smaller diameter transfer discs are alternately arranged with one another so as to communicate with one another, and said larger diameter heat transfer disc has a circulation hole formed at a center of said heat transfer disc;

wherein said larger diameter heat transfer discs are disposed in said casing and peripheries of said larger diameter heat transfer discs are brought into close contact with said inner peripheral surface of said casing;

wherein said circulation hole of said heating element serves as said first inlet and circumferential openings define between said larger and smaller diameter heat transfer discs serve as the first outlet, and said circulation hole of said cooling element serves as said second inlet and said circumferential openings between said larger and smaller diameter heat transfer discs serve as said second outlet;

wherein an inner space defined between said heat insulating material and said inner peripheral surface of said casing serves as a raw material connecting passage for connecting said first outlet of said heating element and said second inlet of said cooling element, in which said first inlet and said first outlet of said heating element communicate with said through holes;

a first heating chamber, which is heated, contacts a rear surface of said larger diameter heat transfer disc of said heating element in said heating means;

a second heating chamber, which is heated, contacts a rear surface of said smaller diameter heat transfer disc;

a first cooling chamber, which is cooled, contacts the rear surface of said larger diameter heat transfer disc of said cooling element in said cooling means; and a second cooling chamber, which is cooled, contacts the rear surface of the smaller diameter heat transfer disc, of said cooling element in the cooling means.

4. A sterilizing apparatus according to claim 3, wherein first concave and convex portions exist at portions where said first and second heating chambers are brought into contact with said rear surfaces of said heat transfer discs of said heating element, and second concave and convex portions exist at portions where said first and second cooling chambers are brought into contact with said rear surfaces of said heat transfer discs of said cooling element.

5. A manufacturing apparatus of liquefied product comprising a raw material storing tank for storing raw material to be subjected to sterilization, and a product storing tank for storing sterilized raw material, wherein said product storing tank is in an inert atmosphere at an inner portion thereof, and wherein said raw material storing tank and said product storing tank are connected to each other by way of supply pipe passages so as to permit said raw material storing tank to communicate with said product storing tank, and wherein a pump is provided upstream relative to said raw material storing tank, and sterilizing apparatus as claimed in claim 1 are provided downstream relative to said pump.

6. The manufacturing apparatus according to claim 5, wherein said raw material storing tank and said sterilizing apparatus are connected to and communicate with said raw material storing tank by way of said supply pipe passages are plural in numbers, an intermediate chamber is provided between said product storing tank and said sterilizing apparatus for storing sterilized raw materials which are discharged from each of said sterilizing apparatus, a fluid mixing apparatus interposed between said intermediate chamber and said product storing tank for mixing a plurality of fluids.

* * * * *

UNITED STATES PATENT AND TRADEMARK OFFICE
CERTIFICATE OF CORRECTION

PATENT NO. : 5 626 823
DATED : May 6, 1997
INVENTOR(S) : Tomio NIIMI

It is certified that error appears in the above-indentified patent and that said Letters Patent is hereby corrected as shown below:

In the Drawings:

Replace the figure of sheet 15 with Figure 15 hereof.

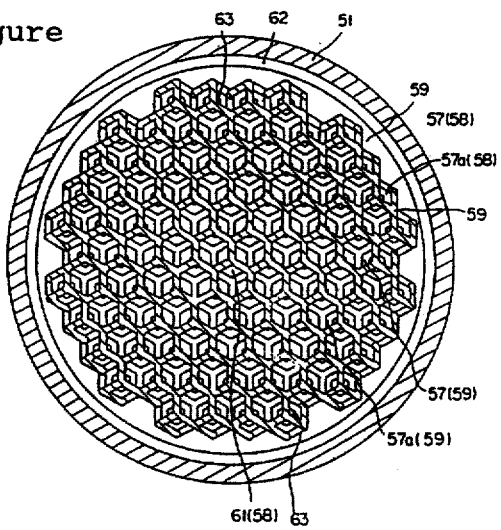

FIG.15

Signed and Sealed this

Fourteenth Day of October, 1997

Attest:

BRUCE LEHMAN

Attesting Officer

Commissioner of Patents and Trademarks